Oct. 19, 1926.                                                  1,603,462
I. HECHENBLEIKNER ET AL
FURNACE
Filed March 25, 1921.          2 Sheets-Sheet 2
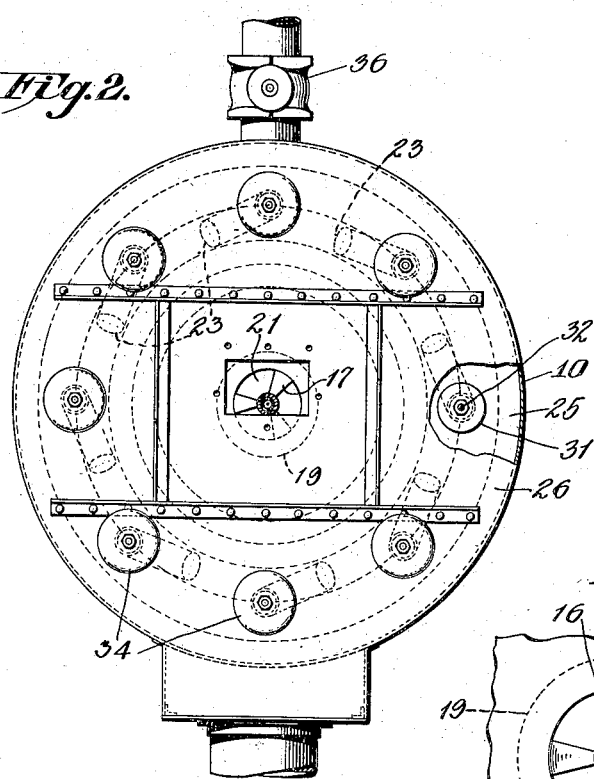
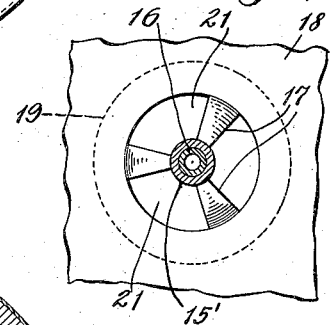
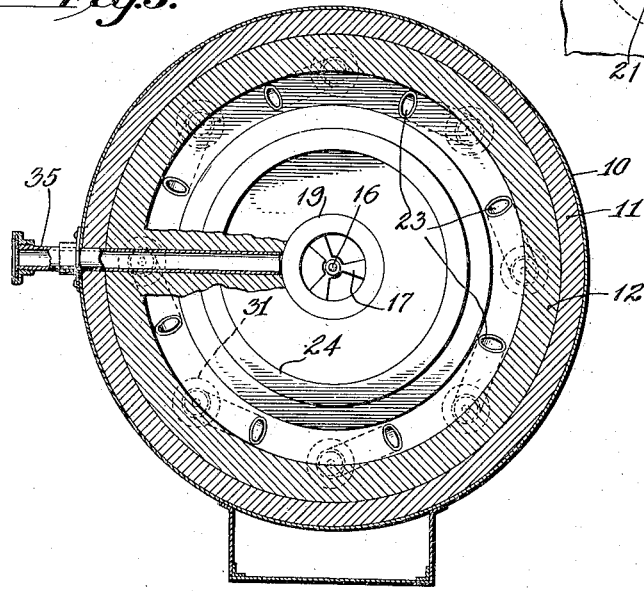
Inventors
Ingenuin Hechenbleikner
and Thomas C. Oliver
By his Attorneys Patented Oct. 19, 1926.

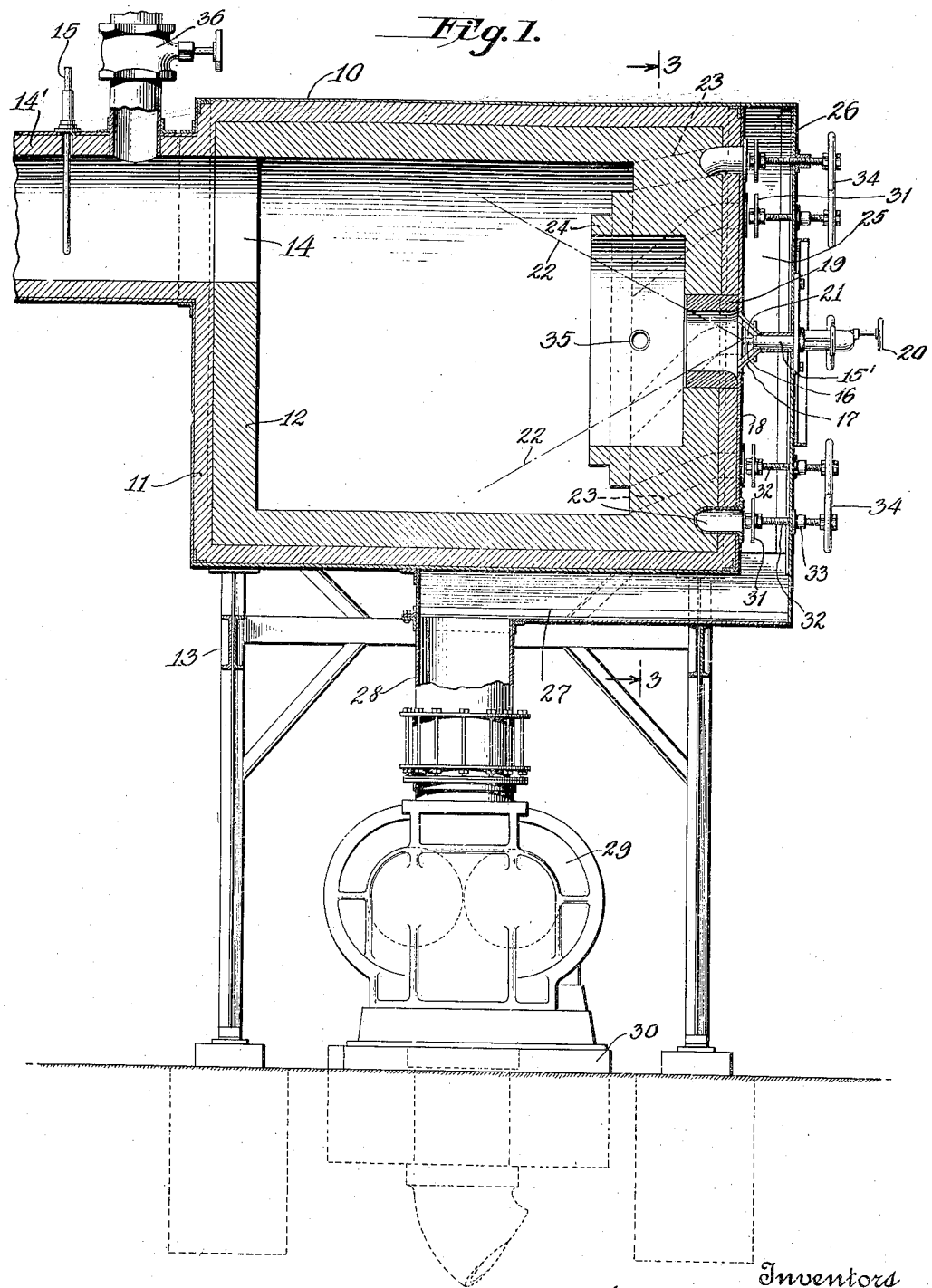

1,603,462

UNITED STATES PATENT OFFICE.

INGENUIN HECHENBLEIKNER AND THOMAS C. OLIVER, OF CHARLOTTE, NORTH CAROLINA, ASSIGNORS TO CHEMICAL CONSTRUCTION COMPANY, OF NEW YORK, N. Y., A CORPORATION OF NORTH CAROLINA.

FURNACE.

Application filed March 25, 1921. Serial No. 455,417.

Our invention relates to a method and apparatus for producing heated gases under pressure and more particularly to a furnace for use with gaseous or liquid fuel in which a volume of air to be heated is introduced into the furnace into contact with the flame and for intermixture with the incompletely oxidized gases of combustion thereby to complete the oxidization of the same; and has special reference to the provision of such a furnace in which the introduction of the air to be heated will not affect the formation or nature of the fuel flame and in which the intermixed gases will produce in combustion a maximum of heat.

The furnace forming the subject matter of our present invention has been designed particularly for use with our method and apparatus for concentrating and purifying sludge acids; disclosed in our co-pending application, Serial No. 410,626, filed September 16, 1920. It will be understood, however, that the furnace comprising our present invention is not limited to use with such method and apparatus, such furnace being of broader utility and adapted for use wherever similar problems are involved. In the said co-pending application we have described a method and means for the treatment of sludge acids in oil refining processes, such treatment having for its object the recovery or restoration of the acid.

For the efficient treatment of the sludge acid to effect a uniform and maximum recovery yield, it has been found desirable to maintain the same at certain definite temperatures. Thus the temperature in the acid flue, for example, should be maintained at about 550° F. To effect this maintenance of temperature it is necessary to provide a constant quantity of heat in the hot gases conducted through the recovery apparatus. For obtaining a constant quantity of heat, means must be provided for the production of a constant quantity of heated gases per unit of time at a constant temperature which may be, for example, between 1000 and 1500° F.; and the conduction of the same through the recovery apparatus at a uniform velocity.

We have found that the desired temperature and pressure of the air or gases may be obtained by the use of a furnace in which a gaseous or liquid fuel is used, in which primary air is mixed with the fuel for combustion and in which secondary air is introduced into the furnace for contact with the fuel flame and for intermixture with the gases of combustion. We have further found that by conducting the secondary air into the furnace so as not to distort or disturb the formation or nature of the flame, that the desired production of a constant quantity of heat may be effected. When a liquid fuel is used, a burner producing a fuel spray is utilized, primary air being conducted into intermixing relationship with the spray for combustion and for the production of a flame of extended formation. The fuel and air are preferably intermixed under pressure; the secondary air being also conducted into the furnace, preferably under pressure, and directed into contact with the flame formation in such manner as not to distort the flame or to hinder the process of fuel oxidation. In this manner perfect oxidation of the fuel results, preventing any formation of smoke or soot that would otherwise result, such complete oxidation giving, moreover, a maximum of heat value, and with a given fuel and primary air pressure there results the formation or generation of substantially a constant amount of the gases of combustion at substantially a constant temperature, yielding substantially a constant heat value. The provision of such a furnace for the production of a constant quantity of heat is a prime object of our invention.

We have further found that not only may the secondary air be forced or conducted into the furnace without distorting or disturbing the formation or nature of the fuel flame for the obtaining of constant characteristics of the gases of combustion and complete oxidation of such gases; but that the secondary air may be so directed into the furnace as to effect a rapid and uniform intermixture between the said secondary air and the gases of combustion in order to obtain constant characteristics as respects pressure, temperature and quantity per unit of time of the intermixed air and gases of combustion. The provision of a furnace in which such intermixture may be effected for this purpose is a further desideratum of our present invention.

The principal objects of our invention therefore include, in addition to the provision of a method, the provision of a furnace in which the heated gases produced may possess substantially uniform characteristics of temperature, pressure and velocity; the further provision of a furnace in which the introduction of the secondary air will not disturb the formation or nature of the fuel flame; the further provision of a furnace in which the gases may be intermixed rapidly and uniformly; the further provision of such a furnace in which the temperature of the intermixed gases may be easily controlled by adjustment and the provision of such a furnace which shall have simplicity of construction and facility of operation and which requires practically no attention during use.

To accomplish the foregoing and such other objects as may hereinafter appear, our invention consists in the elements and their relation one to the other, as hereinafter particularly described and defined in the claims, reference being had to the accompanying drawings which show a preferred embodiment of our invention and in which—

Figure 1 is a side elevational view of our furnace with parts shown in section,

Figure 2 is a front end view thereof with parts broken away,

Figure 3 is a cross sectional view thereof on the line 3—3, Figure 1, and

Figure 4 is a view of a detail.

Referring to the drawings, the combustion chamber of the furnace comprises an outer metallic shell 10 formed preferably of plate metal, the said shell being lined as at 11 with brick lining, the inner walls of the furnace being lined with fire brick as at 12, the furnace being supported by frame work 13 in any approved manner. The furnace is provided at preferably the upper rear end thereof with an opening or port 14 for the outward conduction of the heated gases generated by the furnace, air conduit or manifold 14' communicating with said opening 14 being adapted to be connected by pipe sections (not shown) to the sludge acid recovery apparatus hereinbefore referred to, or other apparatus where gases are desired, the outer and inner walls of the air conduit or manifold 14' having a construction similar to the construction of the combustion chamber 10. A pyrometer 15 may be provided, as shown in Figure 1 of the drawings, and may be located in the conduit or manifold 14'.

A gaseous or liquid fuel may be utilized and where a liquid fuel is used, a burner of the spray or atomizer type is preferably provided. Such a burner is shown in Figure 1 of the drawings as at 15', the burner having nozzle 16 opening into the interior of the combustion chamber; the burner being supported by spider 17, which may be formed integrally with a front plate 18 connected, as by being bolted, to the shell 10. The lining 11 and the fire brick wall 12 are provided at the front of the combustion chamber with openings preferably substantially centrally thereof, the burner 15¹ being mounted, as shown in Figure 1 of the drawings, centrally of the said openings, an annular fire ring 19 being preferably provided and mounted concentrically with respect to the burner and in the said openings. The burner 15¹ is intended to be supplied with fuel under pressure, and is accordingly connected to a proper source of fuel supply, a pump (not shown) being utilized for furnishing the desired pressure if liquid fuel is used or a blower or compresser (not shown) if gaseous fuel is used; valve 20 being provided for controlling the supply of fuel from the source of supply to the burner 15¹.

For the purpose of producing a flame of the usual extended or elongated formation, primary air, preferably under pressure, is conducted into the combustion chamber for intermixture with the fuel for oxidation and combustion. We have found it desirable in order to conduct or introduce primary air for such intermixture, to provide a series of air ports 21 in the spider 17, the construction of the spider including these air ports being shown in detail in Figure 4 of the drawings. Although we utilize air under pressure as the primary gas, it will be apparent to those skilled in the art that we may use other gases such as, for example, steam, enough of the primary gas being introduced to completely oxidize the fuel. When the fuel spray and the primary gas are ignited, a flame of extended formation is obtained, the flame taking a general conical form, as shown at 22 in Figure 1 of the drawings, this flame extending into the combustion chamber for a considerable distance, as indicated in said Figure 1 of the drawings.

For the purpose of producing the necessary volume of heated gases under pressure, secondary air, also preferably under pressure, is introduced into the combustion chamber for contact with the flame and for intermixture with the gases of combustion. We have found that this secondary air may be introduced into the interior of the furnace in such manner as not to affect the formation or nature of the fuel flame. In order to obtain uniform characteristics of the gases of combustion both as respects temperature and the quantity generated per unit of time, it is necessary that the introduction of the secondary air, especially in the large volumes necessary and especially when under pressure, shall not disturb either the form of the flame or the oxidation of the gases taking place during combustion. In order to prevent distorting the flame we introduce the secondary air in such manner that the secondary air comes in contact with the flame and the gases of combustion only after the process of oxidation has gone so far that the completion of oxidation cannot be hindered. To this end we provide preferably a plurality of secondary air inlets or ports 23 arranged preferably circumferentially in the front wall of the combustion chamber and concentrically with the primary air inlets and the burner 15¹. The secondary air inlets 23 preferably comprise channels, as shown particularly in Figure 1 of the drawings, these channels being arranged to direct the secondary air into the interior of the combustion chamber so that such secondary air will come into contact with the flame without preventing fuel oxidation. For the purpose of further effectively preventing any of the secondary air which is driven through the channels 23 under pressure, as hereinabove referred to, from coming in contact with that zone or portion of the flame where oxidation is taking place or where oxidation is in its formative stages, we provide an annular baffle wall 24 arranged concentrically around the burner 15¹ and the fire ring 19, the said baffle wall extending into the interior of the combustion chamber a predetermined distance to further prevent the inflow or inrush of the secondary air from reaching the flame zone which should remain shielded. In this manner and by this means the secondary air may be introduced into the combustion chamber without affecting the essential formation and without affecting the nature of the fuel flame, it having been found that such introduction of the secondary air into the combustion chamber will permit the production of the gases of combustion in constant quantities per unit of time and at a constant temperature, bringing about the desired constant heat characteristics.

We have also found that the secondary air or gas may be so directed into the furnace as to effect a rapid and uniform intermixture between the said secondary air or gas and the gases of combustion in order to obtain constant characteristics as respects pressure, temperature and quantity of the intermixed air and gases of combustion. To this end the secondary air channels 23 are so inclined, as shown in Figures 1 to 3 of the drawings, that the secondary air will receive a whirling motion as it rushes through the said channels 23, the interior walls 12 of the combustion chamber being preferably contoured so as to cooperate with the angularly arranged channels 23 to give the inrush of secondary air its whirling motion. It will be thus apparent that by the rotary or whirling motion of the secondary air in the combustion chamber a rapid and efficient intermixture of the said secondary air with the gases of combustion will take place, yielding intermixed gases having fairly uniform characteristics in every unit of volume as regards temperature, pressure and velocity.

We preferably provide a single supply source for both the primary and secondary air, although it is apparent that distinct sources of supply may be used with equal effectiveness. To this end an air chamber 25 is provided, the said air chamber being defined by a plate 18 and an outer plate 26 forming part of the shell 10, or connected to the shell 10 in any desired manner, the said air chamber being connected as by conduit 27 and pipe section 28 to a centrifugal compresser or blower 29 mounted on the base 30, as shown clearly in Figure 1 of the drawings. As will be apparent, on operation of the centrifugal compressor or blower, compressed air will be forced through the primary air ports 21 and secondary air channels or ports 23.

We have found that the characteristics of the flame as regards temperature and the characteristics of the intermixed gases as regards both temperature and pressure may be easily controlled besides the usual control of fuel pressure, and regulation of the blower 29, by an adjustment of the primary and secondary air inlets. To this end we preferably provide disk valves 31, each of the said disk valves being preferably mounted on a threaded rod 32 rotatably mounted in a threaded flanged element 33, fixed to the front face of the plate 26, the threaded rod being provided at its other end with a hand wheel 34 for operation of the same. As will be apparent, the disk valves 31 overlying the openings 23 will be rotated to and from the openings for easy control of the secondary air ports.

For the purpose of igniting the intermixed fuel and primary air or gas, we preferably provide a tubular element 35, located in the walls of the combustion chamber, as shown particularly in Figures 1 and 3 of the drawings, the said tubular element being intended for the reception of an igniting flame which, when the furnace is to be set into operation, is introduced into the tube and moved over in front of the burner proper and the fuel spray for igniting the same. For the purpose of facilitating ignition and to prevent back pressure we preferably provide an air relief valve 36, as shown in Figure 1 of the drawings.

The use and operation of our furnace will, in the main, be apparent from the above description thereof. Fuel under pressure and primary air under pressure are forced into the furnace for the production of a fuel spray, the spray being ignited by means introduced through the tubular element 35 for the production of a flame of extended formation, this flame being of the conical formation shown in Figure 1 of the drawings. Secondary air or gas is forced under pressure through guiding channels 23, the said guiding channels 23 being so constructed and arranged as to direct the inflow of secondary air into the chamber and into contact with the flame beyond the formative zone thereof, a baffle wall 24 being provided to further shield the formative portion of the flame from the inrush of secondary air. In this manner fuel oxidation is not prevented and the gases of combustion are produced in a uniform manner both as regards quantity and temperature, the said gases of combustion being, moreover, free from smoke or soot. The secondary air, as it is forced into the combustion chamber, is given a whirling effect to facilitate rapid and efficient intermixture of the gases, the intermixed gases being then led through the conduit or manifold 14' and to the sludge recovery apparatus hereinabove referred to, or any other apparatus with which the furnace may be used. The temperature and quantity of produced gases may be controlled in a simple manner by means of the disk valves 31.

It will be apparent from the above that we have provided a novel furnace in which gases may be produced at high temperature and pressure, such gases being obtained under uniform characteristics as regards the temperature, pressure and velocity of the gases.

While we have shown our device in the preferred form, it will be obvious that many changes and modifications may be made in the structure disclosed without departing from the spirit of the invention, defined in the following claims.

We claim:

1. A furnace comprising a combustion chamber, a duct for discharging fuel into the chamber, means for conducting air into the chamber and into intimate intermixture with the fuel for combustion, means for supplying fuel and air under pressure to produce an extended flame, and mechanism for directing a secondary blast of air into the chamber to impinge the stream of intermixed fuel and air beyond the normal flame formation.

2. A furnace comprising a combustion chamber, a duct for discharging fuel into the chamber, means for conducting air into the chamber and into intimate intermixture with the fuel for combustion, means for supplying fuel and air under pressure to produce an extended flame, and mechanism for directing a secondary blast of air into the chamber to impinge the stream of intermixed fuel and air beyond the normal flame formation, said mechanism including means to impart a whirling motion to the secondary blast.

3. In a furnace, a combustion chamber, a fuel burner having its nozzle directed into said chamber, primary air inlet means surrounding the burner for conducting air into said chamber for intermixture with the fuel for combustion and for the production of an extended flame, secondary air inlet means arranged circumferentially about the burner and the primary air inlet means for conducting secondary air into the chamber for intermixture with the gases of combustion, and a baffle wall extending into the chamber and arranged between the primary and secondary air inlet means for shielding the flame from the inflow of secondary air, the said secondary air inlet means being constructed and arranged for imparting a whirling motion to the air flowing therethrough.

4. In a furnace, a combustion chamber, a burner having its nozzle directed into said chamber, an annular baffle wall surrounding the burner and surrounding a predetermined zone of the burner flame, the chamber having gas inlets opening thereinto and arranged concentrically with the annular baffle wall of the burner, the wall being located between the gas inlets and the burner; the said gas inlets being constructed and arranged for imparting to the gas flowing therethrough a whirling motion to effect a rotation of the said gas about the zone beyond the baffle wall.

Signed at New York, in the county of New York and State of New York this 22nd day of March A. D. 1921.

INGENUIN HECHENBLEIKNER.
THOMAS C. OLIVER.